United States Patent
Menachem et al.

(10) Patent No.: US 12,468,402 B2
(45) Date of Patent: Nov. 11, 2025

(54) SECURED KVM SWITCHING DEVICE WITH UNIDIRECTIONAL COMMUNICATIONS

(71) Applicant: FIBERNET LTD., Yokneam Illit (IL)

(72) Inventors: Shiri Menachem, Nesher (IL); Shlomo Groisman, Haifa (IL)

(73) Assignee: FIBERNET LTD., Yokneam Illit (IL)

( * ) Notice: Subject to any disclaimer, the term of this patent is extended or adjusted under 35 U.S.C. 154(b) by 109 days.

(21) Appl. No.: 18/372,086

(22) Filed: Sep. 23, 2023

(65) Prior Publication Data

US 2024/0012489 A1    Jan. 11, 2024

Related U.S. Application Data

(63) Continuation of application No. 17/501,103, filed on Oct. 14, 2021, now Pat. No. 11,768,545, which is a
(Continued)

(30) Foreign Application Priority Data

Jun. 20, 2017    (IL) .......................................... 253041

(51) Int. Cl.
*G06F 3/02* (2006.01)
*G06F 3/023* (2006.01)
(Continued)

(52) U.S. Cl.
CPC ................ *G06F 3/023* (2013.01); *G06F 3/14* (2013.01); *G06F 21/82* (2013.01); *G09G 5/006* (2013.01);
(Continued)

(58) Field of Classification Search
CPC ............ G06F 3/023; G06F 3/14; G06F 21/82; G09G 5/006; G09G 2370/047; G09G 2370/12; G09G 2370/24
See application file for complete search history.

(56) References Cited

U.S. PATENT DOCUMENTS 5,161,021 A    11/1992    Tsai
6,388,658 B1    5/2002    Ahern et al.
(Continued)

FOREIGN PATENT DOCUMENTS

CN    202205133 U    4/2012
CN    202472359 U    10/2012
(Continued)

OTHER PUBLICATIONS

Guri, Mordechai & Solewicz, Yosef & Daidakulov, Andrey & Elovici, Yuval. (2016). SPEAKE(a)R: Turn Speakers to Microphones for Fun and Profit. https://doi.org/10.48550/arXiv.1611.07350.
(Continued)

*Primary Examiner* — Henry Tsai
*Assistant Examiner* — Harry Z Wang
(74) *Attorney, Agent, or Firm* — The Roy Gross Law Firm, LLC; Roy D. Gross (57) ABSTRACT

A Secured Keyboard Video and Mouse (SKVM) system for selectively controlling a plurality of individual computers by a single set comprising a keyboard, a pointing device and at least one video monitor (in some cases, can be controlled also by computer), the SKVM comprising separate electrical circuits for transmitting the display sources, the pointing device and keyboard communications.

12 Claims, 7 Drawing Sheets

Related U.S. Application Data continuation-in-part of application No. 16/603,400, filed as application No. PCT/IL2018/050154 on Feb. 11, 2018, now abandoned.

(60) Provisional application No. 62/481,700, filed on Apr. 5, 2017.

(51) Int. Cl.
  *G06F 3/14* (2006.01)
  *G06F 21/82* (2013.01)
  *G09G 5/00* (2006.01)

(52) U.S. Cl.
  CPC ... *G09G 2370/047* (2013.01); *G09G 2370/12* (2013.01); *G09G 2370/24* (2013.01)

(56) References Cited

U.S. PATENT DOCUMENTS

| | | | |
|---|---|---|---|
| 6,397,269 B1 | 5/2002 | Petty et al. | |
| 6,763,522 B1 | 7/2004 | Kondo et al. | |
| 2002/0143996 A1 | 10/2002 | Odryna et al. | |
| 2003/0110328 A1 | 6/2003 | Seki et al. | |
| 2003/0184960 A1 | 10/2003 | Ferguson | |
| 2003/0217123 A1 | 11/2003 | Anderson et al. | |
| 2003/0218578 A1 | 11/2003 | Ahern et al. | |
| 2004/0062305 A1 | 4/2004 | Dambrackas | |
| 2004/0068737 A1 | 4/2004 | Itoh et al. | |
| 2004/0177264 A1 | 9/2004 | Anson et al. | |
| 2005/0044184 A1 | 2/2005 | Thomas et al. | |
| 2005/0044266 A1 | 2/2005 | O'Neil | |
| 2005/0055582 A1 | 3/2005 | Bazakos et al. | |
| 2005/0080939 A1 | 4/2005 | Onuma et al. | |
| 2005/0286784 A1 | 12/2005 | Gilgen | |
| 2005/0289633 A1 | 12/2005 | Dow, III | |
| 2006/0067690 A1 | 3/2006 | Tatum et al. | |
| 2006/0107061 A1 | 5/2006 | Holovacs | |
| 2006/0147214 A1 | 7/2006 | Ruiz et al. | |
| 2006/0230110 A1 | 10/2006 | Vanharlingen et al. | |
| 2006/0259612 A1 | 11/2006 | De Oliveira et al. | |
| 2007/0058657 A1 | 3/2007 | Holt et al. | |
| 2007/0085825 A1 | 4/2007 | Geffin et al. | |
| 2007/0124474 A1 | 5/2007 | Margulis | |
| 2007/0174526 A1 | 7/2007 | Blackwell et al. | |
| 2007/0239900 A1 | 10/2007 | Beasley et al. | |
| 2007/0261097 A1 | 11/2007 | Siegman et al. | |
| 2007/0296714 A1 | 12/2007 | Kim | |
| 2008/0126629 A1 | 5/2008 | Huang | |
| 2008/0253085 A1 | 10/2008 | Soffer | |
| 2008/0288677 A1 | 11/2008 | Kirshtein | |
| 2008/0313319 A1 | 12/2008 | Geffin | |
| 2009/0033668 A1 | 2/2009 | Pederson et al. | |
| 2009/0058868 A1* | 3/2009 | Kang | G09G 5/006 345/581 |
| 2009/0091665 A1 | 4/2009 | Kang et al. | |
| 2009/0109345 A1 | 4/2009 | Nori | |
| 2009/0125969 A1 | 5/2009 | Hill et al. | |
| 2010/0235551 A1 | 9/2010 | Batish et al. | |
| 2010/0327059 A1 | 12/2010 | Dean et al. | |
| 2011/0026605 A1 | 2/2011 | Costa | |
| 2011/0029699 A1 | 2/2011 | Siegman et al. | |
| 2011/0032982 A1 | 2/2011 | Costa et al. | |
| 2011/0072064 A1 | 3/2011 | Wei et al. | |
| 2011/0145451 A1* | 6/2011 | Soffer | G06F 3/023 710/64 |
| 2011/0208963 A1 | 8/2011 | Soffer | |
| 2011/0304522 A1 | 12/2011 | Zeng et al. | |
| 2012/0159651 A1 | 6/2012 | Beacham | |
| 2012/0243160 A1 | 9/2012 | Nguyen et al. | |
| 2012/0257680 A1 | 10/2012 | Dickens et al. | |
| 2012/0284736 A1 | 11/2012 | Friedman | |
| 2013/0050084 A1 | 2/2013 | Soffer | |
| 2013/0067534 A1* | 3/2013 | Soffer | G06F 3/0227 726/34 |
| 2013/0254439 A1 | 9/2013 | Sundaravel | |
| 2014/0019652 A1 | 1/2014 | Soffer | |
| 2014/0075535 A1 | 3/2014 | Soffer et al. | |
| 2014/0172422 A1 | 6/2014 | Hefetz | |
| 2014/0244856 A1 | 8/2014 | Kambhatla | |
| 2014/0244880 A1* | 8/2014 | Soffer | G06F 3/0227 710/300 |
| 2015/0082460 A1 | 3/2015 | Amiga | |
| 2015/0135264 A1 | 5/2015 | Amiga | |
| 2015/0356045 A1 | 12/2015 | Soffer | |
| 2016/0110303 A1 | 4/2016 | Wei et al. | |
| 2016/0227149 A1 | 8/2016 | Dickens et al. | |
| 2016/0371511 A1 | 12/2016 | Balducci | |
| 2017/0092226 A1 | 3/2017 | Park et al. | |
| 2017/0116147 A1 | 4/2017 | Hsueh | |
| 2017/0192745 A1 | 7/2017 | Sunstrum | |
| 2017/0195374 A1 | 7/2017 | Vu et al. | |
| 2017/0229093 A1 | 8/2017 | Sivertsen et al. | |
| 2017/0300371 A1 | 10/2017 | Soffer | |
| 2018/0101496 A1 | 4/2018 | Chang et al. | |
| 2018/0239719 A1* | 8/2018 | Soffer | G06F 13/4022 |
| 2018/0316946 A1 | 11/2018 | Todd | |
| 2020/0057508 A1 | 2/2020 | Menachem et al. | |

FOREIGN PATENT DOCUMENTS

| | | |
|---|---|---|
| CN | 202771332 U | 3/2013 |
| CN | 202854720 U | 4/2013 |
| CN | 203930617 U | 11/2014 |
| KR | 20160015829 A | 2/2016 |
| WO | 2018172111 A1 | 9/2018 |

OTHER PUBLICATIONS

PCT International Search Report for International Application No. PCT/IL2018/050154, mailed Jul. 20, 2018, 2pp.

PCT Written Opinion for International Application No. PCT/IL2018/050154, mailed Jul. 20, 2018, 8pp.

PCT International Preliminary Report on Patentability for International Application No. PCT/IL2018/050154, issued Oct. 8, 2019, 9pp.

* cited by examiner

SECURED KVM SWITCHING DEVICE WITH UNIDIRECTIONAL COMMUNICATIONS

CROSS-REFERENCE TO RELATED APPLICATIONS

This application is a Continuation of U.S. patent application Ser. No. 17/501,103 filed on Oct. 14, 2021, which is a Continuation-in-Part of U.S. patent application Ser. No. 16/603,400 filed on Oct. 7, 2019, which is a 371 (c)(1) National Phase entry of International Patent Application No. PCT/IL2018/050154 filed on Feb. 11, 2018, all entitled "SECURED KVM SWITCHING DEVICE WITH UNIDIRECTIONAL COMMUNICATIONS", which claims the benefit of priority of U.S. Provisional Patent Application No. 62/481,700 filed on Apr. 5, 2017, and Israeli Patent Application No. 253041 filed on Jun. 20, 2017. The contents of the above applications are all incorporated by reference as if fully set forth herein in their entirety.

FIELD OF THE INVENTION

The present invention relates generally to switch systems for controlling a plurality of computer by a single keyboard, video Monitor and mouse (KVM) and/or a computer. More particularly, it relays to a secure switching system known as KVM provided with the ability to conduct the communication in a unidirectional fashion.

BACKGROUND OF THE INVENTION

A KVM switch (with KVM being an abbreviation for "keyboard, video and mouse") is a hardware device which allows a user to control multiple computers from one or more sets of a keyboard, video monitors, and a mouse. Although multiple computers can be connected to a KVM switch, typically a smaller number of computers can be controlled at any given time. Modern devices have also added the ability to share other peripherals such as USB devices and audio. Modern KVM switches are provided with the ability to conduct bidirectional communication for receiving and transmitting data. The KVM switch allows a remote user to physically connect with remote computers and control them. One of the challenges faced by KVM switch manufacturers is the fact that different computers comprise different monitors. The standard solution for this challenge is provided by the ability to read the monitor settings and use the settings when connecting to the monitors. Most of the KVM switch manufacturers have addressed this challenge with diverse types of solutions which allow the KVM switch to get the specific setting table associated with the monitor. The security issue which may rise out of this ability relies on the fact that monitors can contain a malicious code planed by a hostile entity which can infect other computers connected to the KVM switch. In some scenarios, the ability of the KVM switch to transmit communication with data received from the monitor may be considered as a security threat.

SUMMARY OF THE INVENTION

The present invention discloses a secured switching apparatus which allows utilizing a single pointing device (e.g., mouse), keyboard and at least one display device (e.g., a monitor), to selectively control a plurality of individual computers.

Such computers can be, for example personal computers, personal computer tablets, personal computerized devices, file servers, and the like. The secured switching apparatus disclosed in the present invention, hereafter referred to as Secured Keyboard Video and Mouse (SKVM), comprises separated electrical circuits connected to the display source, the pointing device and the keyboard communications, and allows a communication isolation applied in two aspects. One aspect of the communication isolation provided by the SKVM may be a galvanic isolation which blocks stray currents from passing between the SKVM circuits. Such stray currents (created due to differences in currents induced by the electrical power of the electrical circuits) can be used by a hostile entity to plan malicious code or to connect to computer without permission. Another aspect of the communication isolation provided by the SKVM may be a unidirectional communication, allowing the communication to flow in one direction by utilizing a physical layer which blocks the communication signals from flowing in the opposite direction. Such blocked communications signals can convey commands, data requests, or other transmission which requires an electrical conductivity in order to be transmitted.

In some embodiments of the present invention, the galvanic isolation may be provided by separating the SKVM to different physical cases, wherein some physical cases comprise the connection components and the electrical circuits required to connect with the controlled remote personal computers, and another physical case comprises the connection components and the electrical circuits required to connect with a pointing device, a display device and a keyboard of a user controlling the remote computers. The connection means utilized in the SKVM may be made of optical fibers configured to block the bidirectional communications and allow unidirectional communications only. For example, the connection components and the electrical circuits located within the SKVM case utilized to connect with a remote personal computer can be connected by an optical fiber to the components and the electrical circuits located within the SKVM case connected with the pointing device and the keyboard of the user controlling the remote personal computers. In some cases, lengthy optical fibers may be utilized to connect between the components and the electrical circuits located within the of the SKVM cases, such that the connections may also provide the ability to separate the location of the pointing device and a keyboard of a user which controls the remote computers and the location of the controlled remote personal computers. In some embodiments of the present invention the SKVM may comprise manual switches allowing user to connect the SKVM to a remote personal computer, read the video setting parameters defining the video configuration, store the video setting parameters in a memory, and then in some cases, to change the switch and physically prevent from the monitor of the remote personal computer the access to other components of the SKVM and to other computers connected to the SKVM.

Embodiments of the invention may include a Keyboard Video and Mouse (KVM) communication system, also referred to herein as an SKVM.

According to some embodiments, the SKVM system may include a host emulator (HE) module, configured to: (a) receive at least one peripheral device (PD) signal from at least one respective PD, (b) read a first version of Extended Display Identification Data (EDID) information from a first memory of at least one display device, and (c) manipulate the first version of EDID information to produce a second version of the EDID information.

According to some embodiments, the SKVM system may include a first unidirectional optical fiber data connection, adapted to transmit the PD signals and the second version of EDID information to one or more device emulators (DEs), via a single optical fiber communication channel.

According to some embodiments, the SKVM system may include a first manually controlled relay having at least two states.

According to some embodiments, the one or more DEs may each be associated with at least one corresponding computer. The one or more DEs may be configured to: transmit the at least one PD signal to a PD signal interface of the corresponding computer; store the second version of EDID information on a second memory device, associated with the relevant DE, based on a first state of the first manually controlled relay; and enable the corresponding computer to read the stored EDID information via a DDC connection of the corresponding computer, based on a second state of the first manually controlled relay.

According to some embodiments, the SKVM system may include a switch module, configured to connect the HE to one of said one or more DEs. SKVM system may also include a selector, configured to manually set said switch module to select a DE of the one or more DEs, so as to connect the corresponding computer to the at least one display device.

According to some embodiments, the second version of EDID information may be stored on the second memory device associated with the selected DE.

According to some embodiments, the switch may be configured to enable only the selected DE to enable the corresponding computer to read the stored EDID information via a DDC connection of the corresponding computer, based on a second state of the first manually controlled relay.

According to some embodiments, the SKVM system may include a second manually controlled relay, adapted to connect the at least one HE to the at least one display device, so as to enable the HE module to read the EDID information from the first memory of the at least one display device.

According to some embodiments, the HE module may be associated with a serial-to-parallel module, and the one or more DEs may be each associated with one or more respective SerDes modules. The one or more SerDes modules may be configured to: receive an audiovisual data stream from the at least one corresponding computer; and transmit the audiovisual data stream via a second, unidirectional, single fiber optical communication channel, to the serial-to-parallel module. The serial-to-parallel module may be configured to transmit the audiovisual data stream to the at least one display device to be displayed thereon.

According to some embodiments, the one or SerDes devices may be configured to: receive an audio stream from the one or more respective computers; transmit the audio stream, in addition to said audiovisual data stream, via the second optical communication channel to said serial-to-parallel module. The serial-to-parallel module may, in turn transmit the audio stream to at least audio device to be sounded thereon.

According to some embodiments, the audiovisual data stream may be formatted as a DisplayPort++ (DP++) data stream signal. The one or SerDes devices may be configured to: adapt voltage levels of the DP++ data stream signal to HDMI voltage levels; and transmit the audiovisual data stream in the HDMI voltage levels via the second optical communication channel to said serial-to-parallel module.

The serial-to-parallel module may be configured to transmit the audiovisual data stream to at least one display device, to be displayed thereon.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF THE INVENTION

The present invention discloses a Secured Keyboard Video and Mouse (KVM) system for selectively controlling a plurality of individual computers by a single set comprising a keyboard, a pointing device and at least one video monitor (in some cases, can be controlled also by computer). The SKVM may include separate electrical circuits for transmitting the display sources, the pointing device and keyboard communications. The invention disclosed hereafter may utilize a SerDes (Serializer/Deserializer) module which in some cases, can convert data between serial data interfaces and parallel interfaces and in some cases, can provide data transmissions over a single/differential line in order to minimize the number of I/O pins and interconnects. In some embodiments of the present invention the SerdDes device can be replaced, by a person who has ordinary skills in the art, with other devices or modules provided with the similar functionalities and capabilities.

Figure 1:
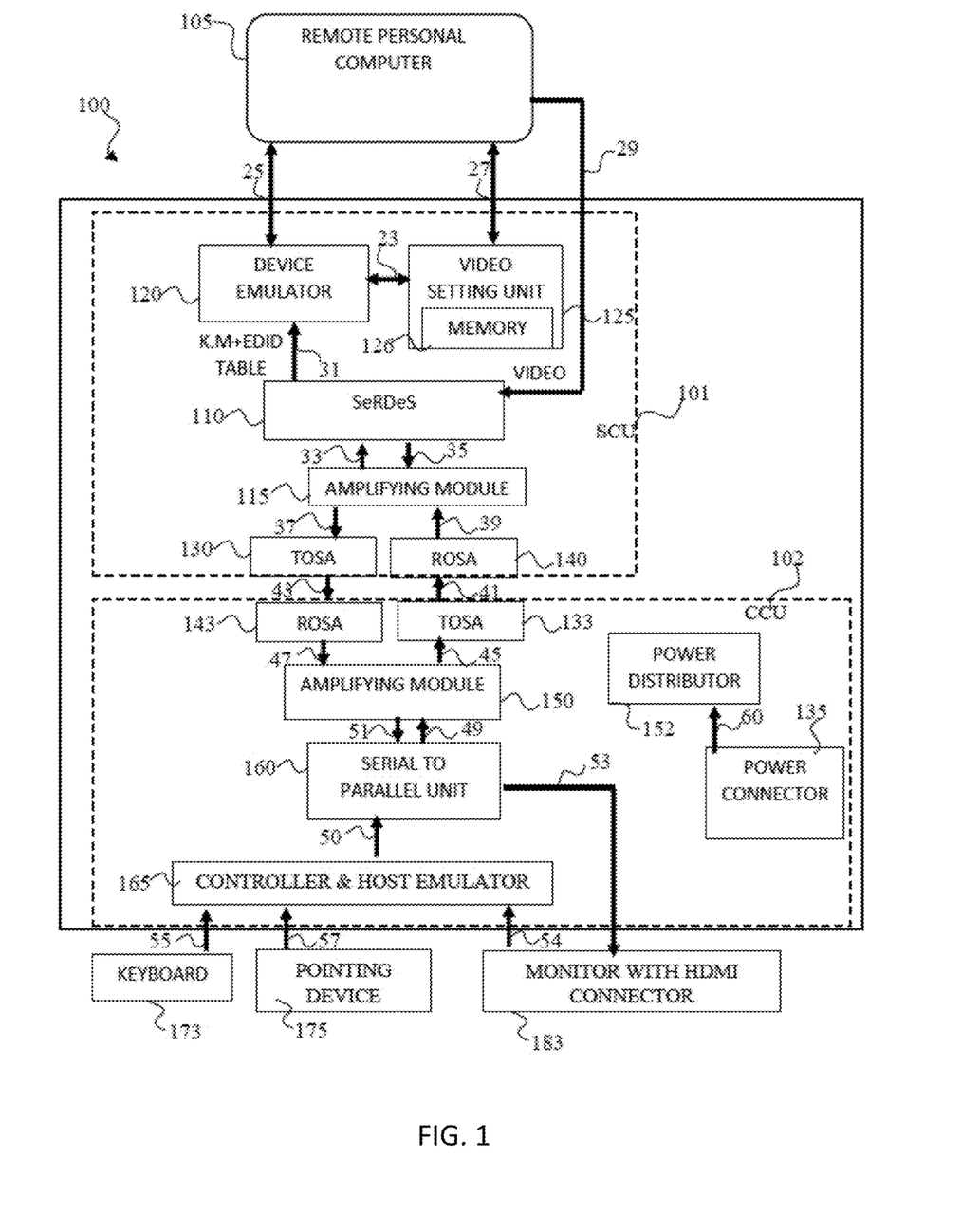
FIG. 1 shows a block diagram of an SKVM communication system connected to a single remote personal computer which can be controlled by a set comprising a keyboard, a display device and a pointing device connected to the SKVM, according to exemplary embodiments of the present invention.

FIG. 1 shows a block diagram of an SKVM communication system connected to a single remote personal computer which can be controlled by a set comprising a keyboard, a display device and a pointing device connected to the SKVM, according to exemplary embodiments of the present invention. FIG. 1 shows a SKVM 100 connected to a personal computer 105. The SKVM enables controlling the personal computer 105 by utilizing a pointing device, a keyboard and a display device. In such cases, the pointing device can be any device such as a graphics tablet, mouse, stylus, pointing-stick, touch-pad, trackball, and the like, used to control the movements of a cursor on a computer screen. The SKVM 100 may include a source connecting unit 101, hereafter referred to as SCU, connected to the personal computer 105 by HDMI connection 27 and a USB connection 25. In some cases, the HDMI connection 27 can be configured to comprise two connection channels: A connection channel 27 which can transmit the control signals configured to carry the HPD (Hot Pluggable Device), and the DDC (Display Data Channel) signals. The personal computer 105 may also comprise an HDMI connection designed to transmit the video stream to the SCU 101 via connection channel 29. For example, the personal computer 105 can utilize the connection channel 29 to transmit the HDMI signals comprising the Transition-Minimized-Differential-Signaling, also known as TMDS, wherein the video content sent to the SCU 101 can comprise the audio content as well.

The SKVM 100 also may include a cross control unit 102, hereafter referred to as CCU designed to perform the following: (1) To receive from the SCU 101 a plurality of optical signals conveying video streams of multiple remote computers and transmit the video content of the video streams to at least one video display device of a user. (2) To receive communication signals of keyboard and pointing device of a user, convert said communication signals to optical signals, to selectively address the optical signals of the keyboard and pointing device to the keyboard and pointing device interfaces of a remote personal computer, and transmit said addressed optical signals to the SCU 101 connected to the remote personal computer. In some cases, the video stream received from the SCU 101 and transmitted to the display device of the user may also comprise audio signals.

In some embodiments of the present invention, the SCU 101 may also comprise a device emulator 120 designed to receive the pointing device and keyboard communication signals (for example, pointing device and keyboard communications received from CCU 102) and convert the communication signals into standard bi-directional keyboard and pointing device data flow. In some cases, such bi-directional data flow may be over USB protocol. The device emulator 120 may be configured to communicate with the remote personal computer 105 utilizing a USB communication standard. The device emulator 120 may also be configured to connect with the video setting unit 125 designed as emulation controller functions to display Extended Display Identification Data (EDID) signals. The video setting unit 125 may be configured to receive and store an EDID setting table from the device emulator 120 via communication channel 23. The communication channel 23 designed to connect data sources in a form of electromagnetic waves, may also be configured to support DDC protocols, such as standard serial signaling scheme known as an I2C standard.

The video setting unit 125 may also comprise a memory module 126 which can be utilized to store the EDID setting table received by the video setting unit 125. Such an EDID setting table received and stored in the memory module 126 may be a parameter array comprising the parameters required to define the display type and functionalities. In some cases, SKVM 100 may be configured to receive the monitor parameters of the EDID setting table via the DDC pins of the HDMI connection 54, and transmit these parameters to the serial to parallel unit 160 in order to be sent further and stored in the memory module 126. In some other cases a narrow portion of the parameters of the EDID setting table may be transmitted and eventually stored in the memory module 126.

In some cases, the EDID setting table may be compliant with the EDID technical standards as defined by VESA (Video Electronics Standards Association). In some other cases, the EDID setting table may be narrowed or different from the EDID technical standards as defined by VESA. For example, the EDID setting table may be narrowed from the 128-byte standard table. In some cases, the EDID setting table may comprise an extension for the basic 128-byte standard table. For example, the EDID setting table may comprise an additional 128-byte blocks of data to describe increased capabilities. In some embodiments of the present invention, the parameters of the EDID setting table may be received via the DDC pins of the HDMI connection 54 which may be connected to the monitor with HDMI connector 183. In some cases, such a transition may require additional setting by a person, as defined in FIG. 6 and FIG. 7. Once the EDID setting table is stored in the memory module 126, the remote personal computer 105 can read the required parameters via connections 27 and then transmit the video stream accordingly, via connection 29. In some cases, the device emulator 120 may connect with the video setting unit 125 via the physical communication channel 23 which can be configured to support DDC protocols, such as standard serial signaling scheme known as a I2C standard.

The SCU 101 also may include a Serdes (Serializer/Deserializer) module 110. The Serdes module 110 may be configured to receive keyboard and pointing device serial communications, and convert the communication structure from a serial communication structure to a UART (Universal Asynchronous Receiver/Transmitter) communication structure. The Serdes module 110 may also be configured and transmit the received UART communications to the device emulator 120 which can convert the communication structure from UART serial communication structure to a USB (Universal Serial Bus) communication structure. The device emulator 120 can also transmit the communication to the remote personal computer 105 via communication channel 53. The Serdes module 110 may also be configured to transmit the EDID setting table, or in some cases, tables, to the device emulator 120. The device emulator 120 may be configured to transmit the received EDID setting table, or in some cases, tables, to the video setting unit 125. The video setting unit 125 can then store the received EDID setting table in the memory module 126. In some cases, the memory module 126 can be a non-volatile memory designed to store and/or erase data stored in the memory. For example, the memory module 126 may comprise EPROM chips.

In some embodiments of the present invention, the SCU 101 may comprise an amplifying module 115 which can be configured to amplify the signals received from the Serdes 110 via connection 33. The amplifying module 115 can utilize connection 33 to communicate with the Serdes 110 and connection 35 to receive communications from the Serdes 110. The SCU 101 may also comprise a TOSA (Transmitter Optical Sub-Assembly) 130 for converting electrical signals to optical signals conveyed into an optical fiber, and a ROSA (Receiver Optical Sub-Assembly) 140 for receiving optical signals conveyed by an optical fiber and converting the optical signals back into electrical signals. For example, the ROSA 140 can receive optical signals from an optical fiber 41, convert the optical signals to electrical signals and communicate the electrical signals further via electrical connection 39 to the Serdes 110 by transmitting the electrical signals through the amplifying module 115. The TOSA 130 can also receive electrical signals from an electrical connection 37, convert the electrical signals to optical signals and communicate the optical signals further via optical connection 43. In a preferred embodiment of the present invention, connections 41, and 43 can utilize optical fiber to convey the transmissions between SCU 101 and CCU 102. Thus, utilizing of optical fibers can provide a unidirectional communication at the physical layer level which allows communication signals to pass in one direction and blocks communication from passing in the opposite direction.

The CCU 102 which may be integrated into the SKVM 100 can be configured to receive optical communication from a plurality of remote computers and allow controlling the remote computers from a single controlling source. Such a controlling source may comprise a single pointing device, keyboard and at least one display device, such as keyboard 173, monitor with HDMI connector 183, and pointing device 175, or in some cases such a controlling source may be a computer connected to the CCU 102. The CCU 102 can receive and transmit the communications via the devices ROSA 143 and TOSA 133. The ROSA 143 and the TOSA 133 may function at the same fashion as ROSA 140 and TOSA 130, and communicate via the amplifying module 150 which can be configured to amplify the signal strength of the communication signals.

The CCU 102 also may include a serial to parallel unit 160 designed to receive the serial communication and build the HDMI data structure out of the received data. The serial to parallel unit 160 may also be configured to receive serial communication signals of keyboard 173 and pointing device 175, and send the communications signals further in a serial communication format to the amplifying module 150. The CCU 102 can also comprise a controller and host emulator 165 designed to receive standard bidirectional peripheral protocol such as USB, and translate user key-codes and pointing device (or in some cases, the USB may be replaced by two multi-pin electrical connectors such as PS/2 connectors) moves into standard or proprietary unidirectional serial protocol. For example, the controller and host emulator 165 can receive keyboard and pointing device signals from the Keyboard 173 and pointing device 175 and transmit said signals to the serial to parallel (e.g., serial to HDMI) unit 160. The controller and host emulator 165 may also be designed to receive the DDC pins of the HDMI connection 54 which may be connected to the monitor with HDMI connector 183. In some cases, the connection 54 may convey the DDC settings which can be utilized to build the EDID setting table. For example, the DDC settings of monitor with HDMI connector 183 can be transferred to the controller and host emulator 165 and the controller and host emulator 165 can receive the DDC setting, build an EDID setting table and transmit it further in order to address it to the memory unit 126.

The serial to parallel (also referred to herein as serial to HDMI) unit 160 can also transmit HDMI communication signals conveyed via communication channel 53. The communication channel 53 can be a HDMI connector which can receive the HDMI signals from the serial to HDMI unit 160 and transmit the HDMI signals to the monitor with HDMI connector 183 via a HDMI connector. For example, the video stream received via connection 47 from ROSA 143 may be delivered to the amplifying module 150. Then, the amplifying module 150 may transmit the video stream in a serial structure via connection 51 to the serial to HDMI unit 160. The serial to HDMI unit 160 may convert the video stream structured in a serial structure to video stream structure which adheres to TMDS, according to the HDMI standard and protocols. The video stream can be transmitted via connection 53 to the monitor with HDMI connector 183. In some cases, the HDMI connection can convey two connection channels: A connection channel 54 which can be the control signals configured to carry the HPD (Hot Pluggable Device), and the DDC (Display Data Channel). and a connection channel 53 which can be configured to carry the TMDS video signals. The connection 54 designed to support DDC (Display Data Channel) protocols, may also support other standards such as standard serial signaling scheme known as an I2C standard. In some preferred embodiments of the present invention, the video stream can comprise the audio content as well.

According to some embodiment, the audiovisual data stream (e.g., video 29) may be formatted as a DisplayPort++ (DP++) data stream signal. In such embodiments, SerDes device 110 may adapt voltage levels of the DP++ data stream signal 29 to HDMI voltage levels. SerDes device 110 may transmit the adapted version of audiovisual data stream 29 in the HDMI voltage levels, via a unidirectional, single fiber optical communication channel (e.g., elements 35 of FIG. 1) to serial-to-parallel module 160 in CCU 102.

Serial-to-parallel module 160 may (or may not), apply a reverse conversion of voltage to adapted version of audiovisual data stream 29 (e.g., back to DP++ voltage levels), and may transmit the audiovisual data stream to at least one display device (e.g., monitor 287/290) to be displayed thereon.

The CCU 102 may be connected with pointing device 175, keyboard 173 and monitor with HDMI connector 183 which may be the peripheral devices of the controlling source which remotely controls the remote personal computer 105. Thus, the controller and host emulator 165 can connect with pointing device 175 and keyboard 173 via connections 55 and 57. Such a connection may utilize a standard bidirectional peripheral protocol such as USB. In some cases, the connections 55 and 57 may be configured to convey communications structured in serial, synchronous and bidirectional protocols such as PS/2 or other mini-DIN connection types. The CCU 102 also may include a power connector to receive power from an external resource. Such external resource may be a low power supplier, for example, a signal conditioning unit. The power connector may be coupled with the power distributor 152 via connection 60.

Figure 2:
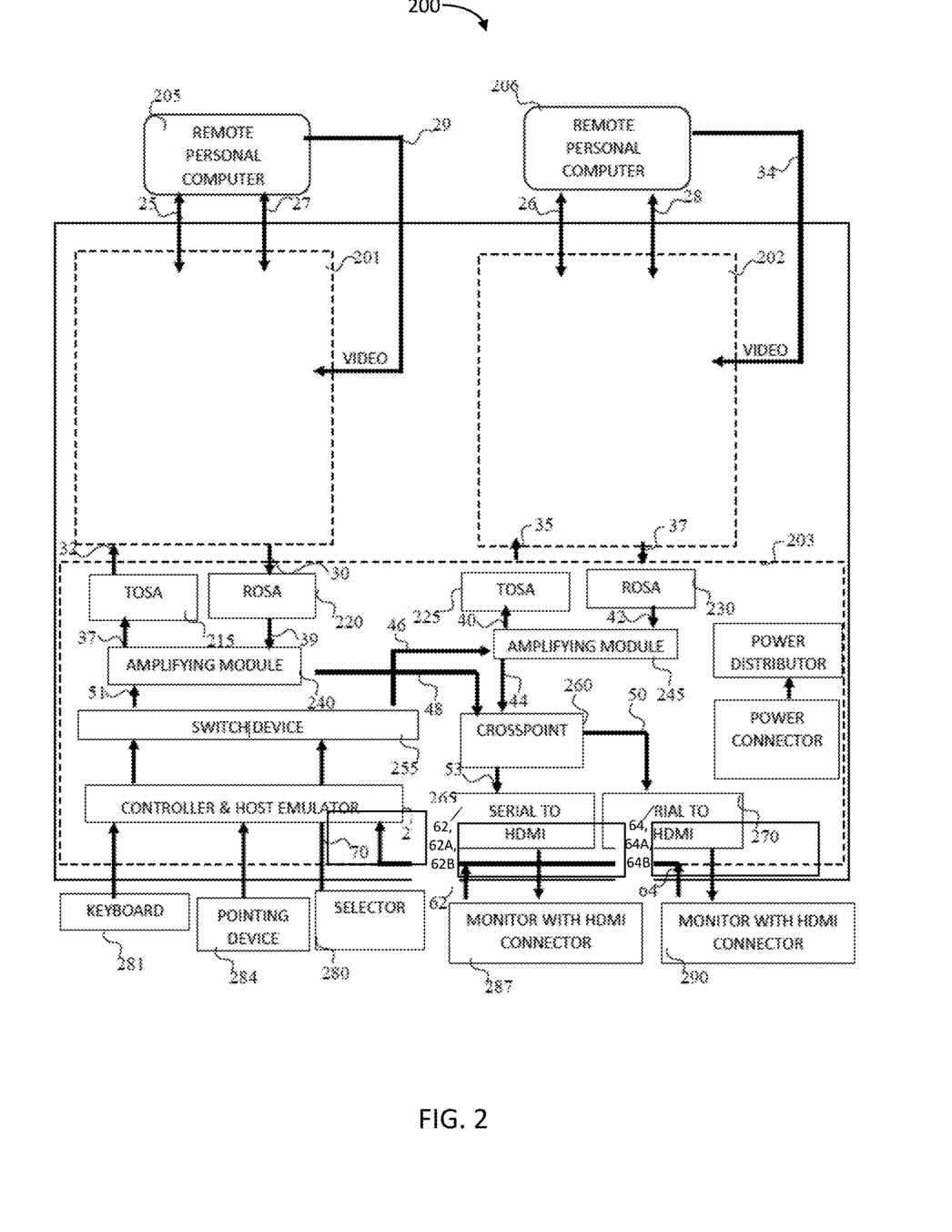
FIG. 2 shows a block diagram of an SKVM communication system connected to more than one remote personal computer which can be controlled by a keyboard and a pointing device connected to the SKVM, according to exemplary embodiments of the present invention.

FIG. 2 shows a block diagram of an SKVM communication system 200 connected to more than one remote personal computer which can be controlled by a keyboard and pointing device connected to the SKVM 200, according to exemplary embodiments of the present invention.

It may be appreciated that SKVM communication system (or SKVM, for short) 200 of FIG. 2 may include the same modules and functions of SKVM communication system 100 of FIG. 1. Some elements of SKVM 200 have been omitted for the purpose of brevity.

FIG. 2 shows an SKVM 200 connected to remote personal computers 205 and 206. SKVM 200 may include an SCU 201 and SCU 202 which can be connected to the remote personal computers 205 and 206. The SKVM 200 may include the SCU 201 connected to the remote personal computer 205 via connection 25 which can be a USB connection. In some cases, connection 25 which may be a USB connection may also provide the power source of the SCU 201. The SCU 201 may also comprise connections 27, and 29 which may be HDMI connections. The SKVM 200 also may include an SCU 202 connected to the remote personal computer 206 via connections 26, 28, and 34 which may be USB connections or/and HDMI connections. In some cases, the connection 26 which may be a USB connection may provide the power source to the SCU 202.

The SKVM 200 also may include a CCU 203 designed to connect between a keyboard 281, pointing device 284, and more than one SCU unit connected to remote personal computers. For example, CCU 203 can be connected to a controlling source comprising keyboard 281, pointing device 284 and monitor with HDMI connector 287, to SCU 201 via optical fiber connection 30 and 32, and to SCU 202 via optical fiber connections 35, and 37. The CCU 203 also may include TOSA 225 and ROSA 230 connected to SCU 202 and configured to transmit the communication signals between the SCU 202 and CCU 203. The CCU 203 also may include TOSA 215 and ROSA 220 connected to SCU 201 and configured to transmit the communication signals between the SCU 201 and CCU 203. CCU 203 also may include amplifying modules 240, and 245 designed to communicate with the ROSA and TOSA units and amplify the signal strength of the communications.

In some embodiments of the present invention, the connections from the amplifying modules 240, and 245, and the ROSA and TOSA units may be configured for unidirectional communications. For example, ROSA 220 can communicate with amplifying module 240 via connection 39 in a unidirectional communication which allows the signals to flow only from the ROSA 220 to the amplifying module 240, TOSA 215 can communicate with the amplifying module 240 via connection 37 in unidirectional communication which allows the signals to flow only from the amplifying module 240 to the TOSA 215, ROSA 230 can communicate with amplifying module 245 via connection 42 in a unidirectional communication which allows the signals to flow only from the ROSA 230 to the amplifying module 245, and, TOSA 225 can communicate with the amplifying module 245 via connection 40 in a unidirectional communication which allows the signals to flow only from the amplifying module 245 to the TOSA 225. The amplifying modules 240 and 245 which receive and transmit the communications may also be designed to amplify the signal strength of the communication.

The amplifying modules 240 and 245 may be configured to receive the signals of the video stream from ROSA 220 and 230, and route the received signals to the cross-point 260. The cross-point 260 may be a digital network-switch device designed to route video communications. The amplifying modules 240 and 245 may also be configured to receive the signals from ROSA 220 and 230 and simultaneously to convey the transmissions to the TOSA 215 and 225. In some cases, when the user uses only one video monitor, the cross-point 260 may switch the view on the monitor according to the selection at the selector 280. The selector 280 may be connected to the switch device 255 via electrical connection 70. The selector 280 may be configured to set the switch device 255 to route the pointing device 284 and the keyboard 281 to the corresponding SCU connected to the selected remote personal computer. For example, in case a user controlling the remote personal computer 206 wants to switch the controlling and control the remote personal computer 205, the user may utilize the selector 280 to set the switch device 255 such that the communication signals of keyboard 281 and pointing device 284 can be transmitted to the CCU 201 and therefrom, the communication signals can be transmitted to the keyboard and pointing device interfaces of the remote personal computer 205.

In possible embodiments of the present invention the selector 280 may be configured to change the routing of the video streams of the selected remote personal computer to the selected monitor with HDMI connector. For example, in case a user utilizing one video monitor, switches between the remote personal computer 205 and the remote personal computer 206, for example by using the selector 280, the screen content of the remote personal computer 205 may be replaced with the screen content of the remote personal computer 206, and the keyboard 281 and pointing device 284 may control the remote personal computer 206. I some embodiments of the present invention the selector 280 may be also configured to control the cross-point 260 and thereby change the routing of the video streams. In some cases, the CCU 203 may comprise a plurality of selectors for selecting remote personal computers.

In some cases, a local computer connected to the Host Emulator 275 in the CCU 203 via UART or USB connection, may control the switching between the remote personal computer 205 and the remote personal computer 206 via sending a predefined string of keyboard keys instead of the button 280.

The amplifying module 240 can also be configured to route the signals of the video stream received from ROSA 220 to the cross-point 260. Similarly, the amplifying module 245 may receive the signals from ROSA 230, and route the received signals with the video stream to the cross-point 260. In some cases, the switch device 255 may be configured to utilize the connections 51, and 46 to transmit the keyboard, the pointing device and the EDID signals to the amplifying modules 240, and 245, respectively. The switch device 255 can be a digital network switch device designed to route serial communication in a PCB, or in other electronic devices. The switch device 255 may have in-ports for receiving the keyboard and pointing device (and EDID) signals and route them to the specific amplifying module, in accordance with the specific remote personal computer required to be controlled. For example, in case the personal computer controlled by a user is the remote personal computer 205, the switch device 255 may transmit the keyboard and pointing device (and EDID) communication signals to amplifying module 240 which can transmit the communication signals further to TOSA 215. In case the personal computer controlled by a user is the remote personal computer 206, the switch device 255 may transmit the keyboard and pointing device communication signals to amplifying module 245 which can transmit the signals further to TOSA 225. In some cases, the SKVM 200 may also have a selector 280 designed to control the communication signal routing of the switch device 255. Selector 280 may be connected to the switch device 255 and allow selecting the specific remote computer which the CCU 203 controls. For example, in case the user controlling the remote personal computer 205, the user may be able to utilize the selector 280 to select another remote personal computer such as remote personal computer 206.

In some embodiments of the present invention, the CCU 203 may be configured to work with more than one monitor. Thus, the CCU 203 may have more than one serial to parallel (e.g., serial to HDMI) unit such as 265 and 270. For example, the user may configure to receive the video content of the remote personal computer 205 in monitor with HDMI connector 287, and the video content of the remote personal computer 206 in monitor with HDMI connector 290. In some cases, the host emulator 275 which can receive the pointing device 284 and keyboard 281 signals may also be configured to receive the monitor DDC parameters of monitor with HDMI connector 287 via the DDC pins of the HDMI connection 62 and the DDC parameters of monitor with HDMI connector 290 via the DDC pins of HDMI connection 64. In some embodiments the present invention, the host emulator 275 may be designed to receive the keyboard 281 and pointing device 284 signals and convert said signals to universal asynchronous receiver/transmitter, also known as UART.

Figure 3:
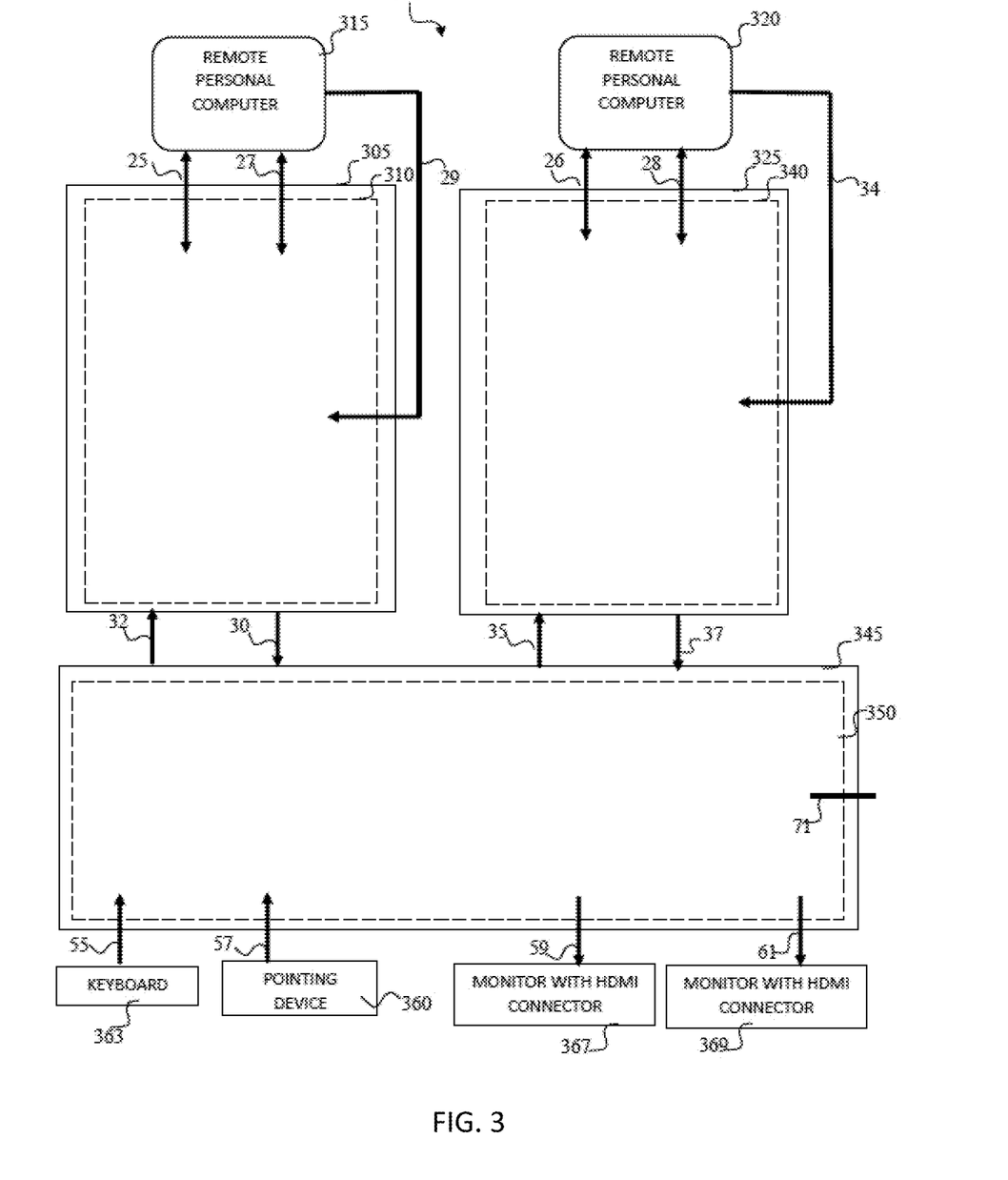
FIG. 3 shows a block diagram of an SKVM communication system provided by physically separated cases with a galvanic isolation, according to exemplary embodiments of the present invention.

FIG. 3 shows a block diagram of an SKVM communication system provided by physically separated cases with a galvanic isolation, according to exemplary embodiments of the present invention. FIG. 3 shows an SKVM 300 comprising SCU 310, SCU 340 and CCU 350. The SCU 310 can be provided within a case 305 and the SCU 340 can be provided within case 325. The cases 325 and 305 may be the enclosures comprising the components of the SCU 310 and 340. The cases 305, and 325 can be provided with a total isolation which blocks stray currents from passing out, passing between the case 305, and the 325, or passing to the CCU 350.

The cases 325 and 305 can be located at the proximity of the controlled remote personal computers. For example, the SCU 310 located within case 305 can be connected to the remote personal computer 315 via connection 25 which may be a USB connection, and the connections 27 (and 29) which may carry out the HDMI communication. In some cases, connection 25 which may be a USB connection may also provide the power source of the SCU 310. In such case, connection 25 can be configured to be an exclusive power source for SCU 310, wherein no other electrical devices are sharing the power conveyed by connection 25. Similarly, the SCU 340 located within case 325 can be connected to the remote personal computer 320 with connections 26, and with connection 28 (and 34). In some cases, connection 26 which may be a USB connection may also provide the power source of the SCU 340. In such case, connection 26 can be configured to be an exclusive power source for SCU 340, wherein no other electrical devices are sharing the power conveyed by connection 26.

In some cases, the remote personal computers 315, and 320 may be located in two different locations. The two different locations may be locations with no physical connections between them. Such different locations can be two different places in a room, two different rooms, two different buildings, and the like.

The SKVM 300 also may include a CCU 350 provided with a case 345 which can be an enclosure comprising the components of the CCU 350. The cases 345 can be provided with a total isolation which blocks stray currents from passing to the case 305, and to the case 325. The CCU 350 may be connected to a power connector 71 to receive power from an external resource. Such external resource may be a low power supplier. In some cases, connector 71 can be configured to be an exclusive power source for SCU CCU 350, wherein no other electrical devices are sharing the power conveyed by connector 71.

The CCU 350 can be connected to a keyboard 363 via connector 55 and to pointing device 360 via connector 57. The CCU 350 may also be connected to at least one monitor provided with an HDMI connector. For example, CCU 350 may connected to monitor 367 via connector 59, and in some cases, the CCU 350 may be connected simultaneously to monitor 369 via connection 61. In some cases, a user utilizes the CCU 350 to control the remote personal computers 315 and 320 can direct the keyboard and pointing device to one remote personal computer, for example, remote personal computer 315, and then, to switch the control to the other remote personal computer, for example, remote personal computer 320. In some cases, the CCU 350 may have a mechanism to change the controlled remote personal computer (not shown). Such a mechanism may be a switch, button, a selector button, a keystroke of a predefined keyboard key string, and the like.

A user utilizing the SKVM 300, may also have the option to view the screen content of the two remote personal computers simultaneously. For example, a user may receive the screen content of remote personal computer 315 at monitor 367 and receive the screen content of the remote personal computer 320 in monitor 369. In some embodiments of the present invention, the user may connect only one monitor with HDMI connector (for example monitor 369) to the CCU 350, in such cases, the user may be able to view the screen content of the controlled personal computer in the display device of monitor with HDMI connector. For example, in case a user controlling the remote personal computer 320, switches to control the remote personal computer 315. Upon switching, the screen content shown on the user monitor may be replaced from the screen content of the remote personal computer 320 to the screen content of remote personal computer 315. In some cases, the change on the screen content shown on the user monitor may controlled at the same mechanism utilized to select the specific remote computer which the CCU 350 controls.

The CCU 350 may be connected to the SCU 310 and 340 via optical fibers. For example, the CCU 350 can be connected to the SCU 310 via optical fiber connections 30 and 32, and to SCU 340 via optical fiber connections 35 and 37. In some cases, the CCU 350 may be located in a different and separate location from SCU 310 and SCU 340.

Figure 4:
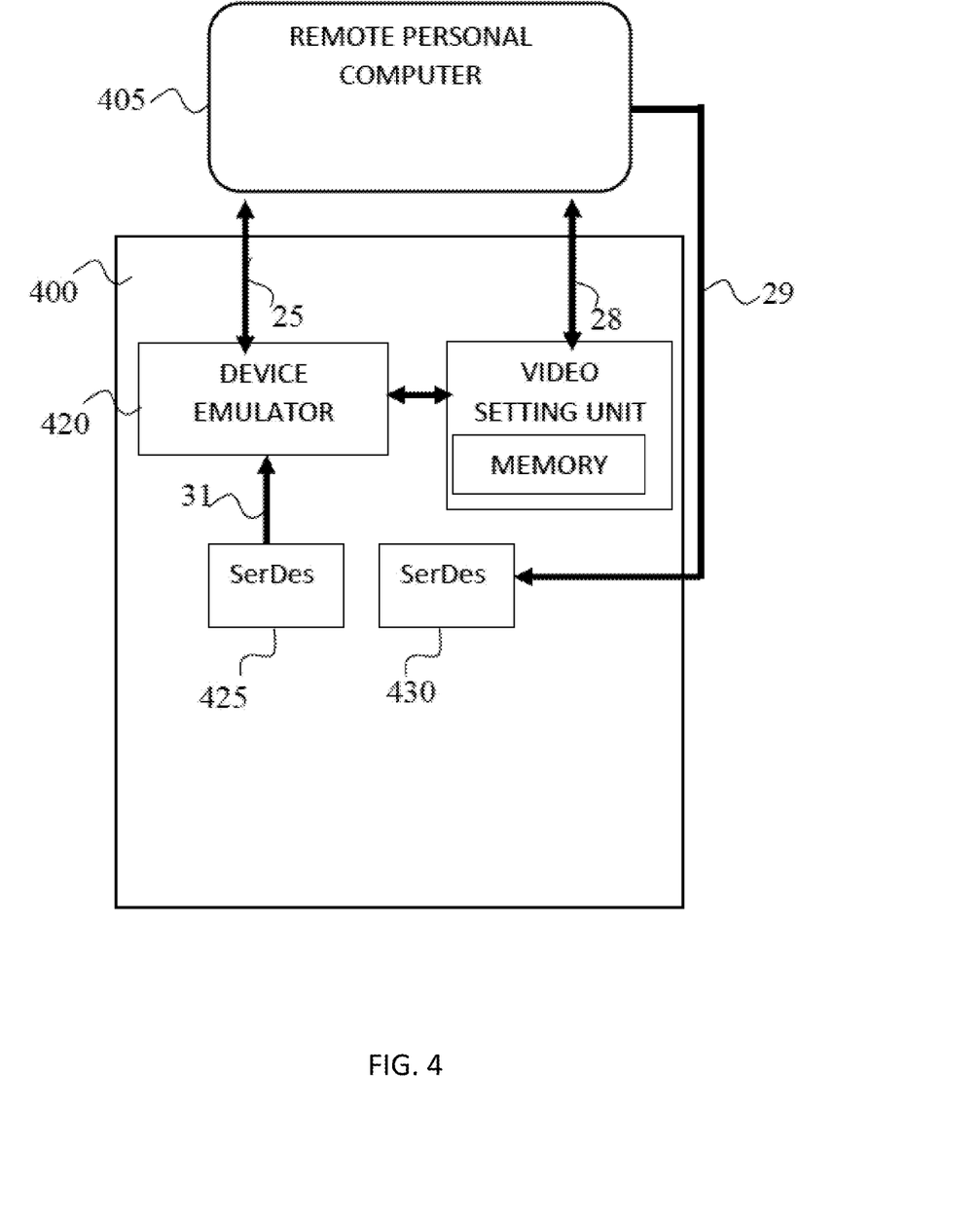
FIG. 4 shows a SCU connected to a remote personal computer, wherein the SCU may include two Serdes modules for managing the serial and parallel connections to and from the remote personal computer, according to exemplary embodiments of the present invention.

FIG. 4 shows a SCU connected to a remote personal computer, wherein the SCU may include two Serdes modules for managing the serial and parallel connections to and from the remote personal computer, according to exemplary embodiments of the present invention. FIG. 4 shows an SCU 400 connected via connection 25, connections 28 and connections 29 to the remote personal computer 405. SCU 400 may include a device emulator 420 designed to receive the pointing device and keyboard communications and convert the incoming data back into standard bi-directional keyboard and pointing device data flow, or in some cases, a USB data flow. In some embodiments of the present invention, the SCU 400 may comprise more than one Serdes modules to convert incoming parallel communications to outcoming serial communication, and to convert incoming serial communication to outcoming parallel. In some cases, different Serdes modules may be designed to convert communications with different bandwidths. For example, a Serdes module 430 may be connected to the video connection 29 receive and convert communications at a bandwidth rate of 10 Giga bit per second. The Serdes module 425 may receive and convert communications of keyboard and pointing device (and DDC information) at the bandwidth rate of up to 250 Mega bit per second.

Figure 5:
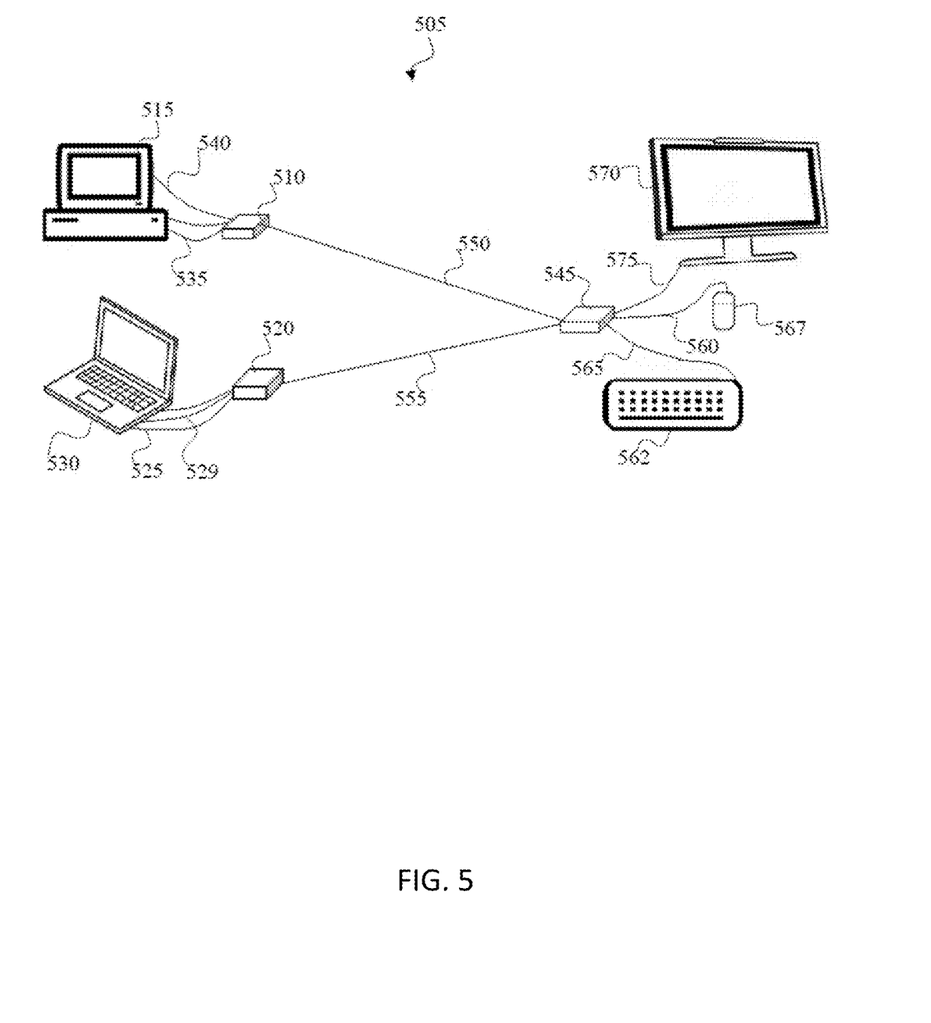
FIG. 5 shows a deployment of an SKVM communication system provided by separated cases, according to exemplary embodiments of the present invention.

FIG. 5 shows a deployment of an SKVM communication system provided by separated cases, according to exemplary embodiments of the present invention. FIG. 5 shows a SKVM 505 comprising a CCU 545, an SCU 510, and an SCU 520. The CCU 545 can be connected to keyboard 562 via connection 565 and to pointing device 567 via connection 560. The CCU 545 can also be connected to a monitor 570 via connection 575 which may be a HDMI connection. Thus, the keyboard 562 and pointing device 567 may be able to control remote personal computers such as remote laptop 530 and computer 515. The monitor 570 can receive the video communication signals from the CCU 545 and thereby show the screen content seen on the screen of the remote personal computer 515 and remote laptop 530. CCU 545 also can be connected to SCU 520 via connections 555 which may be two or more optical fibers designed to convey optical transmissions. In some cases, the TOSA and ROSA (not shown) of CCU 545 may be connected to the ROSA and TOSA of SCU 510 via the optical fiber connections 555. Similarly, the CCU 545 can also be connected to SCU 510 via connections 550 which may be two or more optical fibers designed to convey optical transmissions. In some cases, the user which controls the remote personal computer 515 and the remote personal computer 530 may be able to switch between the computers 515 and 530 to control different computers in different times. For example, the user may switch the CCU 545 to receive the video stream and connect the communication signals of keyboard 562 and pointing device 567 to the remote computer 530. Thus, the user may be able to control the remote personal computer 530 via the keyboard 562 and pointing device 567 and view the screen content shown on the screen of the remote personal computer 530 at the monitor 570. The user can then switch to control the remote personal computer 515 and thus, to control the interfaces of keyboard and pointing device of the remote personal computer 515 and view the screen content shown on the screen of the remote personal computer 530, at the monitor 570. The SCUs 510 and 520 can be connected to the remote personal computers 515, 530 with separate connections to the controlled computer. For example, SCU 510 may utilize the connection 540 to receive the video streaming from the remote personal computer 515 and the optical fiber connection 550 to transmit the video stream to the CCU 545, the connection 535 to transmit the keyboard 562 communication signals and the pointing device 567 communication signals from the CCU 545 to the remote personal computer 515. At the same fashion, the SCU 520 may utilize the connection 529 to receive the video streaming from the remote laptop 530 and the optical fiber connection 555 to transmit the video stream to the CCU 545. The SCU 520 may also utilize the connection 525 to transmit the keyboard communication signals, and the pointing device communication signal received from the CCU 445 to the remote laptop 530.

In some cases, the personal computers 510 and the remote laptop 530 may be located in two separate locations, and the monitor 570 with the pointing device 567 and keyboard 562 may be located in a third separate location. Thus, the optical fiber connections 550 and 555 may be designed to convey optical signals for long distances. Such long distance can be, in some cases, a number of kilometers.

In some embodiments of the present invention, the SKVM 505 may comprise a plurality of SCU's. For example, an SKVM can comprise one CCU 545 connected to more than 2 SCU's. The SCU may be separately connected to different computers, laptops, computerized devices, and the like. In some cases, the switching between the remote computers is performed by a selector (which may be a manual button or a switch-selector) or by a combination of keyboard keys or by a control computer connected to the CCU 545 via a UART or USB connection.

Figure 6:
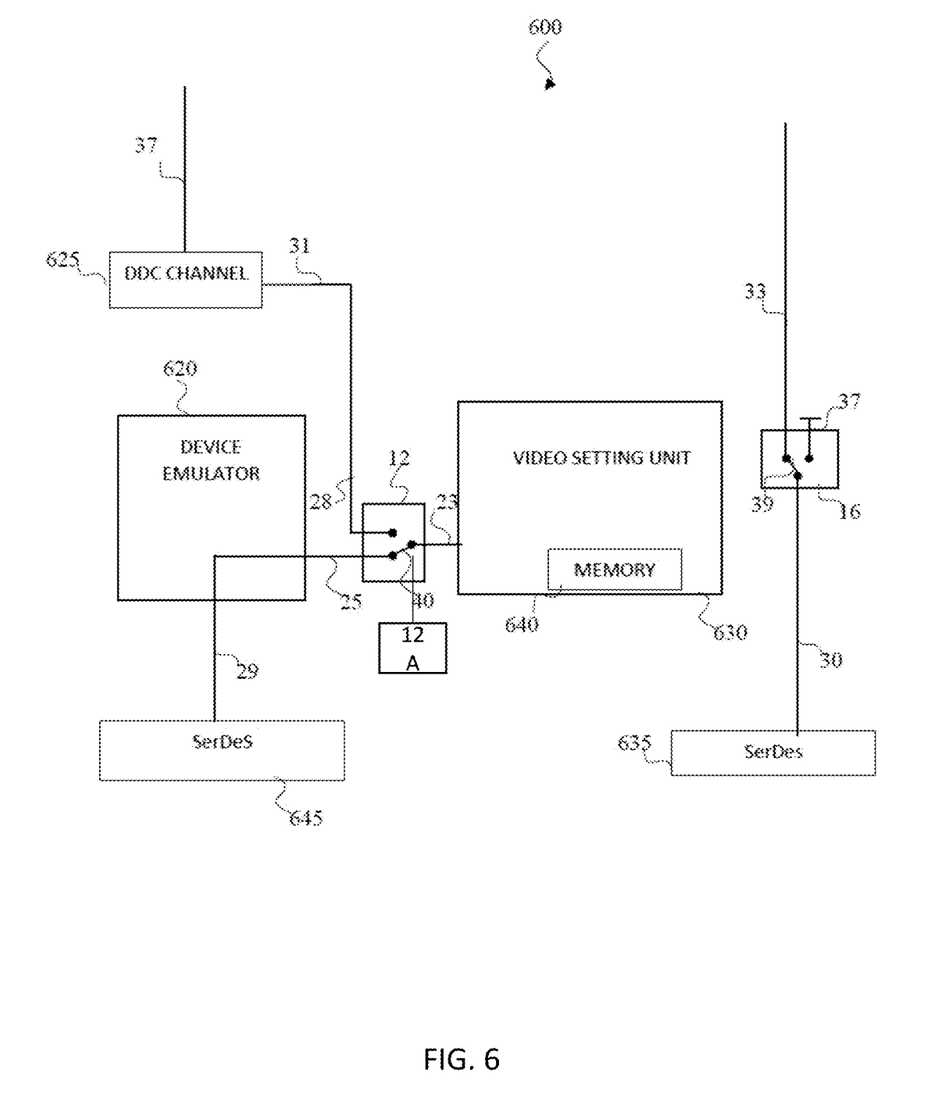
FIG. 6 shows an SKVM communication system configuration of the device emulator and the video setting unit which provides an option to block the video signaling comprising write commands or any connection of which is not a pure video communication signal to the SKVM, according to exemplary embodiments of the present invention.

FIG. 6 shows an SKVM configuration of the device emulator and the video setting unit which provides an option to block the video signaling comprising write commands or any connection of which is not a pure video communication signal to the SKVM, according to exemplary embodiments of the present invention. FIG. 6 shows an SKVM configuration 600 with a device emulator 620 connected to a relay 12. The relay 12 can connect the device emulator 620 to the video setting unit 630 for sending the EDID setting table received from the device emulator 620 to the video setting unit 630. In some cases, such an EDID setting table may be received by the controller and host emulator integrated at the CCU, via the SerDes 645 which can be connected to the device emulator 620 via connection 29. In some other cases, such an EDID setting table may be originated by the monitor with HDMI connection operated by the user. The relay 12 may be configured to be controlled by a manual switch and connect or disconnect the device emulator 620 from the video setting unit 630. Such a connection between the device emulator 620 and the video setting unit 630 may be utilized to transfer the EDID setting table from the device emulator 620 to the video setting unit 630. For example, in case the connection 40 in the relay 12 is set to connect between connection 25 and connection 23 the device emulator 620 can send the EDID setting table to the video setting unit 630. Thus, the video setting unit 630 can store the EDID setting table in the memory 640.

The relay 12 may have another connection mode which connects between connection 28 and connection 23. In such a connection mode, the device emulator 620 and the video setting unit 630 may be disconnected. The user may set the relay 12 to connect between the device emulator 620 and the video setting unit 630 to allow the EDID setting table to be transmitted to the video setting unit 630. In such cases, the user may can set the relay 12 to disconnect the device emulator 620 and the video setting unit 630. Such a connection mode may block any changes in the EDID setting table or unwanted data connection. In such a connection mode, wherein the relay 12 of the SKVM is configured to disconnect the device emulator 620 and the video setting unit 630, the DDC channel 625 and the video setting unit 630 may be connected. In some cases, the DDC channel 625 may be the DDC channel of a HDMI connection according to the HDMI universal standard.

In some cases, the connection modes of relay 12 may be controlled by a manual button which can operate the relay 12. For example, the user may have a manual button or a switch which can be used in order to connect between connection 25 and connection 23. In some cases, said manual button or the switch may be configured such that upon releasing the manual button or switch, the relay 12 may disconnect the connection 25 and connect between connection 28 and connection 23. In some embodiments of the present invention an automatic mechanism may be employed in order to operate the relay 12. For example, an automatic mechanism may connect between connection 25 and connection 23 during a specific period of time, or in some cases, until the parameters of the EDID setting table is fully stored in the memory unit 640 and then, the automatic mechanism may disconnect between connection 25 and connection 23 and connect between connection 28 and connection 23 to connect the DDC channel 625 and the video setting unit 630 for the remote personal computer to be able to get the EDID parameters.

The connection between connection 28 and connection 23 may allow the remote personal computer to utilize the DDC Chanel 625 for obtaining some parameters of the EDID setting table stored in the memory 640. For example, in case a user connects the connection 25 to the connection 23 by using the relay 12, and the video setting unit 630 may receive the EDID setting table. The user can change the connection mode and set the relay 12 to connect the DDC channel 625 to the video setting unit 630 by changing the relay setting and move the connection 40 to connect between the connection 28 and connection 23. In such case, the DDC Channel may receive the EDID setting from the EDID setting table stored in memory 640. Thus, the Device Emulator 620 channel 25 may not be allowed to change the stored EDID setting table. The memory 640 can be a non-volatile memory designed to store and/or erase data stored in the memory.

The SKVM configuration 600 also may include a HDMI TMDS video signals connection 33 which connects between the remote person computer and the SerDes 635. Such connection may be to receive the video stream transmitted by the HDMI connection 33 and transmit the video stream to the CCU, via SerDes 635. In some cases, the connection between the SerDes 635 and HDMI connection 33 may be managed via relay 16 which can utilize the connection 39 to connect between HDMI connection 30 and HDMI connection 33. The relay 16 may have the option to disconnect between the HDMI connection 30 and HDMI connection 33 by setting the connection 39 to connect between HDMI connection 30 and connection 37.

In some cases, the relay 16 may be configured to disconnect between the HDMI connection 30 and HDMI connection 33. For example, a user may utilize the relay 16 to disconnect between connection 30 and connection 33 and connect between connection 25 and 23 until the parameters of the EDID setting table are fully stored in the memory unit 640. Once the parameters of the EDID setting table are stored in the memory 640, connection 25 and connection 23 can be disconnected and connection 23 can be connected with connection 28, to allow the DDC channel 625 to connect to the memory 640 for receiving the parameters of the EDID setting table. Once EDID setting table is stored in the memory 640, the relay 16 can connect between the HDMI connection 30 and HDMI connection 33.

Figure 7:
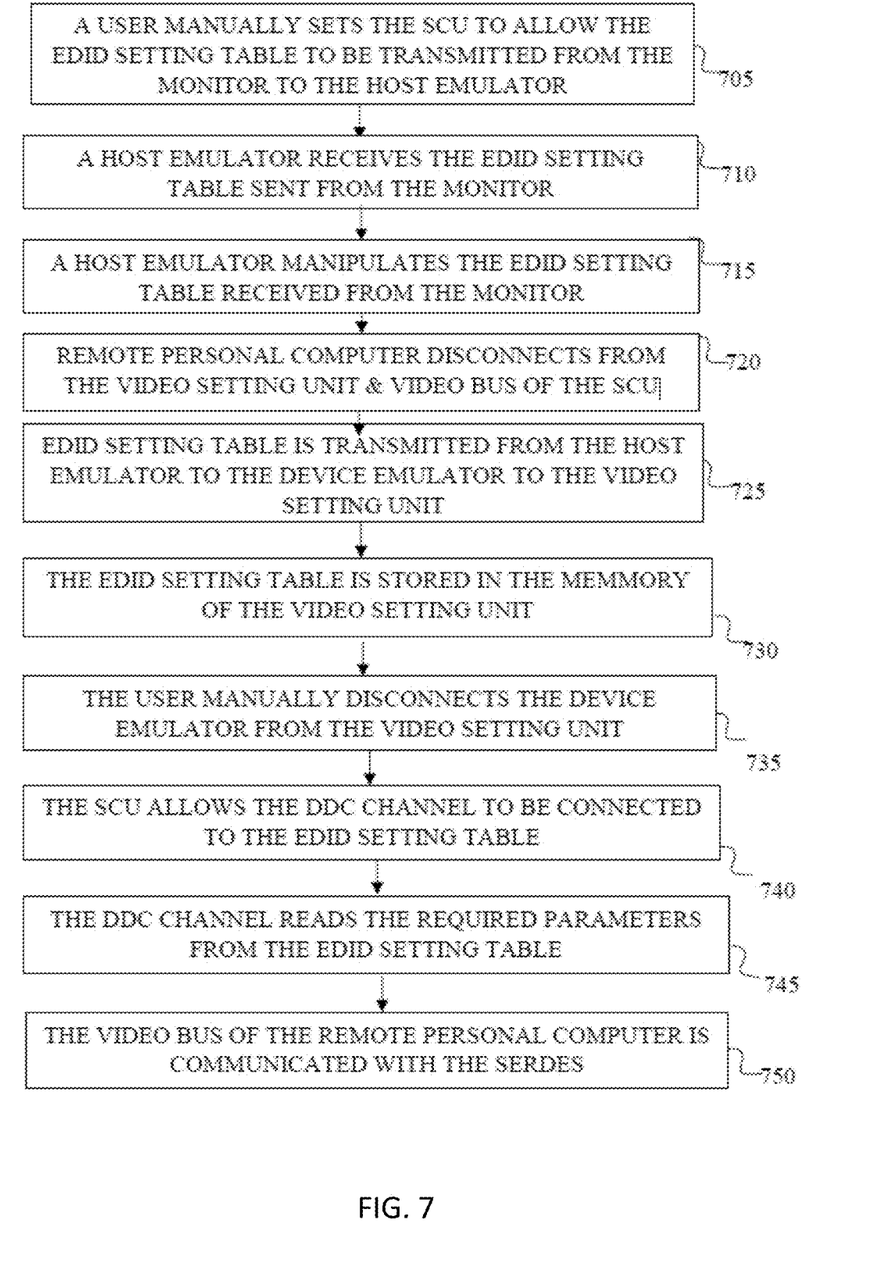
FIG. 7 discloses a method for receiving the video setting from a monitor with HDMI connection, and storing the video setting in the memory, according to exemplary embodiments of the present invention.

FIG. 7 discloses a method for receiving the video setting from a monitor with HDMI connection, and storing the video setting in the memory, according to exemplary embodiments of the present invention. Step 705 discloses the phase wherein the user manually sets the host emulator located in the CCU to receive the EDID setting table from a monitor of the remote personal computer. In such cases the SKVM can be configured to allow the controller and host emulator of the CCU to be connected via the DDC connection to the monitor of the remote personal computer and read the EDID parameters of said monitor. In some cases, the user may set the CCU manually by switching a switch which disconnects by hand. In some cases, the SKVM case may comprise a button which can be utilized by the user for connecting the host emulator to the remote personal computer's monitor.

In step 710, the controller and host emulator receives an EDID setting table from the device display of the of the user, which may be contented to the SKVM. The controller and host emulator may be connected to the monitor via a HDMI connection. In some cases, the EDID setting table may be received via the DDC channel of the HDMI connection of the user's device display. In step 715, the controller and host emulator can manipulate and configure the EDID setting table according to some predefined rules. For example, the controller and host emulator may remove specific EDID variables from the original EDID setting table in order to meet the security requirements defined by a user. In step 720 DDC channel of the remote personal computer may be disconnected from the video setting unit of the SCU and the Video TMDS BUS may be disconnected from the video SeRDes of the SCU. In some cases, such disconnection may be an automatic disconnection which takes place after the EDID setting table has been received by the controller and host emulator. In some other cases, a user may be required to manually initialize the disconnection of the DDC channel of the remote personal computer. In step 725 the EDID setting table may be transferred from the controller and host emulator to the device emulator and from the device emulator to the video setting unit. In step 730 the EDID setting table received by the video setting unit is stored in a dedicated memory. In step 735 the user may be able to disconnect the device emulator from the video setting unit. The disconnecting of the device emulator from the video setting unit creates a physical block which prevents the DDC channel to be connected with any additional remote computer connected to the SKVM. In step 740 the SCU may allow the DDC channel to be connected to the EDID setting table. In step 745 The DDC channel may be utilized to transfer the HDMI parameters and the EDID setting table, which may be needed for the video communications between the user's display device connected to the SCU and the remote personal computer. In such cases, the configuration and setting utilized in an HDMI communication may be read from the EDID setting table stored in the memory of the video setting unit. In step 750 the HDMI connection of the monitor of the remote personal computer may be able to transfer video stream according to the parameters appear in the EDID setting table and stored in the memory of the video setting unit.

As elaborated herein, SKVM communication system (e.g., SKVM communication system 200 of FIG. 2) may include a host emulator (HE) module (e.g., "controller and host emulator" 275 of FIG. 2, which may be the same as controller and host emulator 165 of FIG. 1).

As elaborated herein (e.g., in relation to FIG. 1), HE 275 may be configured to receive at least one peripheral device (PD) signal from at least one respective PD, such as a mouse (e.g., pointing device 284 of FIG. 2) or a keyboard (e.g., keyboard 281 of FIG. 2), and transmit the PD signals one or more device emulators (DEs, e.g., device emulator 120 of FIG. 1), via a single optical fiber communication channel (e.g., element 41 of FIG. 1).

As elaborated herein (e.g., in relation to FIG. 1 and FIG. 2), each DE 120 may be included in an SCU module (e.g., 101, 201, 202), and each SCU module may be associated with a corresponding computer (e.g., computers 205, 206 of FIG. 2). In other words, the one or more DEs 120 of SCUs 201, 202 may each be associated with at least one corresponding computer (e.g., 205, 206). The one or more DEs 120 may be configured to transmit the at least one PD signal to a PD signal interface (e.g., a mouse interface, a keyboard interface, etc.) of the corresponding computer (e.g., 205, 206).

Additionally, as elaborated herein (e.g., in relation to FIG. 7), HE 275 may be configured to read a first version of EDID information (also referred to herein as an "EDID settings table") from a memory device (e.g., an Electronically Programmable Read Only Memory (EPROM) device) of at least one display device (e.g., monitor 183 of FIG. 1).

Additionally, as elaborated herein (e.g., in relation to FIG. 7), HE 275 may manipulate the first version of EDID information (e.g., the EDID settings table) to produce a second version of the EDID information. For example, HE 275 may receive or maintain one or more definitions of rules from a user, and may omit, or change specific EDID variables or configurations from the original EDID setting table in order to meet the security requirements defined by the user. It may be appreciated that such rules may be configured to impose limitations on the EDID information, and may thus prevent a malicious user from exploiting system vulnerabilities (e.g., by performing stack overflow attacks).

As elaborated herein, HE 275 may transmit the PD signals and the second version of EDID information to one or more device emulators via the single fiber optical communication channel 41 to one or more device emulators 120 on an SCU (e.g., element 101 of FIG. 1 and/or element 201, 202 of FIG. 2). The one or more device emulators 120 may receive the PD signals and the second version of EDID information (e.g., the manipulated EDID settings table) from HE 275, via optical communication 41, amplifying module 115 and SerDes 110, as depicted for example in FIG. 1.

As elaborated herein (e.g., in relation to FIG. 6), SKVM 200 may include a first relay (e.g., relay 12 of FIG. 6) having at least two states. Relay 12 may be a manually controlled relay 12, in a sense that a user may select a state of the relay directly or indirectly, e.g., by manually pressing a button 12A. For example, button 12A may be configured such that upon releasing the manual button or switch, the relay 12 may disconnect the connection 25 and connect between connection 28 and connection 23. Additionally, or alternatively, an automatic mechanism may be employed in order to operate relay 12.

As shown in FIG. 6, DE 120 (also referred to as DE 620 of FIG. 6) may be associated with a video setting unit 630, in a sense that DE 620 and video setting unit 630 may be included in the same SCU (201/202). Video setting unit 630 may include a memory device 640, hence DE 620 also be associated with local (e.g., on same SCU) memory device 640.

As elaborated herein (e.g., in relation to FIG. 6), DE 120 (620) may store the second version of EDID information (e.g., the manipulated EDID settings table) on memory device 640, associated with the relevant DE 120 (620), based on a first state of manually controlled relay 12. Additionally, DE 120 (620) may enable the corresponding computer (e.g., 205/206) to read the stored EDID information (e.g., the manipulated EDID setting table) via a DDC connection 31 of the corresponding computer (e.g., 205/206), based on a second state of the manually controlled relay 12.

For example, in embodiments where an automatic mechanism is employed to operate relay 12, an automatic mechanism may connect between connection 25 and connection 23 during a specific period of time, or in some cases, until the parameters of the EDID setting table is fully stored in the memory unit 640 and then, the automatic mechanism may disconnect between connection 25 and connection 23 and connect between connection 28 and connection 23 to connect the DDC channel 625 and the video setting unit 630 for the remote personal computer (e.g., 205, 206) to be able to read the second (e.g., manipulated) version of EDID information.

Additionally, or alternatively, in embodiments where button 12A is employed to operate relay 12, pressing the button may connect between connection 25 and connection 23, allowing storage of the second (e.g., manipulated) version of EDID information on memory device 640. In such embodiments, releasing button 12A may disconnect between connection 25 and connection 23 and connect between connection 28 and connection 23 to connect the DDC channel 625 and the video setting unit 630, allowing reading of the second (e.g., manipulated) version of EDID information by computer 205/206.

As elaborated herein (e.g., in relation to FIG. 2), SKVM 200 may include a switch module 255 and a selector module 280. Selector module 280 may facilitate selection (e.g., by a user) of a specific SCU unit (e.g., 201, 202), and switch module 255 may be configured to connect CCU 203 to the selected SCU unit 201/202.

In other words, selector module 280 may allow manual or automatic selection of a DE 120 (associated with a corresponding), and switch module 255 may be configured to connect HE 275 of CCU 203 to one of (e.g., the selected) DE. Subsequently, switch module 255 may connect the computer (e.g., 205/206) corresponding to the selected DE to at least one display device (e.g., monitor 287, 290).

According to some embodiments, the one or more DEs 120 (620) may collaborate with switch 255 so as to store the second version of EDID information (e.g., the manipulated EDID setting table) only on the memory device 640 associated with the selected DE.

Additionally, or alternatively, the one or more DEs 120 (620) may collaborate with switch 255 so as to allow selective reading of the stored EDID information. For example, only the selected DE 120/620 may be configured to allow the corresponding computer 205/206 to read the stored EDID information (e.g., the manipulated EDID setting table) via DDC connection 31, based on a state of manually controlled relay 12 (e.g., after button 12A is released).

According to some embodiments, SKVM 200 may include at least one other relay, denoted as elements 62A and 64A of FIG. 2, (located on HDMI connections 62 and 64 respectively). Relay 62A/64A may be manually controlled (e.g., via button) or otherwise automatically administrated (e.g., via a trusted computing device), as elaborated herein in relation to relay 12 relay. Relay 62A/64A may be adapted to connect HE 203 to at least one display device (e.g., monitor 287, 290), so as to enable HE 203 to read the EDID information from a memory device (e.g., EPROM) of the at least one display device 287/290. In other words, activating relay 62A/64A (e.g., by pressing button 62B/64B respectively) may connect HE 203 to display monitor 287/290, and allow HE 203 to perform a handshake process, during which EDID data may be read from a memory device of the connected monitor 287/290.

The present invention may thus include several improvements over currently available systems and methods for securing KVM communication.

For example, as elaborated herein, SKVM 200 may only allow manual (e.g., via a button) or otherwise administrated (e.g., by a trusted computing device) access of CCU 203 to read EDID data from a memory of a selected display device.

In another example, as elaborated herein, SKVM 200 may enforce security rules on the EDID information by censoring or manipulating the EDID data (e.g., the EDID settings table) prior to being read by computer 205/206.

In another example, as elaborated herein, SKVM 200 may only allow manual (e.g., via a button) or otherwise administrated (e.g., by a trusted computing device) writing or storing of EDID data (e.g., the manipulated EDID settings table) in a local memory device 640 that is accessible by computer 205/206.

In another example, as elaborated herein, SKVM 200 may only allow manual (e.g., via a button) or otherwise administrated (e.g., by a trusted computing device) reading of EDID data (e.g., the manipulated EDID settings table) from the local memory device 640, by computer 205/206.

In another example, as elaborated herein, SKVM 200 may restrict the storage and/or reading of EDID data (e.g., the manipulated EDID settings table) to a single selected computer 205/206, corresponding to the selected DE 120/620 (e.g., as selected by selector 280).

As elaborated herein (e.g., in relation to FIGS. 1,2), the one or more DEs 120 of SKVM 200 may each associated with a respective SerDes device 110, in a sense that both may be included in a single SCU module 101. Additionally, HE module 203 may be is associated with a serial-to-parallel 160 (or serial-to-HDMI 265) module, in a sense that both may be included in a single SCU module 102/203.

The one or more SerDes devices 110 may be configured to receive an audiovisual data stream (e.g., "video" elements 29, 34 of FIG. 2) from the at least one corresponding computer 205/206. The term "audiovisual data stream" may be used in this context to refer to signals that convey video data, audio data or a combination thereof, such as HDMI signals, DisplayPort signals and the like. The one or more SerDes devices 110 of SKVM 200 may transmit the audiovisual data stream 29/34 via a unidirectional, single fiber optical communication channel (e.g., elements 30, 37 of FIG. 2), to serial-to-parallel module 160 in CCU 203. Serial-to-parallel module 160 may, in turn transmit the audiovisual data stream to at least one display device (e.g., monitor 287/290) to be displayed thereon.

According to some embodiments, the one or more SerDes devices 110 may further receive an audio stream from the at least one corresponding computer 205/206. For example, connection 26 may be a USB connection, by which computer 206 may be identified vis-à-vis SCU 202 as a sound card. In this configuration, connection 26 may be referred to as an audio channel, and SerDes device 110 of SCU 202 may receive an audio data stream via audio channel 26. In such embodiments, SerDes device 110 may transmit the audio stream of audio channel 26 in addition to, or in conjunction with the audiovisual data stream 29/34, via the unidirectional, single fiber optical communication channel 37 to serial-to-parallel module 160. Serial-to-parallel module 160 may in turn transmit the audio stream of audio channel 26 to at least audio device (e.g., a speaker) to be handled (e.g., sounded) thereon.

While the disclosure has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings without departing from the essential scope thereof. Therefore, it is intended that the disclosed subject matter is not limited to the particular embodiment disclosed as the best mode contemplated for carrying out this invention, but only by the claims that follow.

The invention claimed is:

1. A Keyboard Video and Mouse (KVM) communication system, comprising:
 a host computer emulator configured to receive at least one peripheral device signal from at least one respective peripheral device, and to receive Extended Display Identification Data (EDID) information from a display device;
 a first unidirectional data connection adapted to transmit the peripheral device signals and the EDID information from the host computer emulator to a device emulator, wherein said device emulator is associated with a host computer and is adapted to transmit the peripheral device signals and the EDID information to the host computer;
 a video connection adapted to connect to a video interface of the host computer and to transmit a video stream from said host computer to said display device through a second unidirectional data connection; and
 a video setting unit configured to:
  (i) in a first connection mode, (x) disconnect from a Display Data Channel (DDC) of the host computer and connect to said device emulator, to receive and store said EDID information transmitted through said first unidirectional data connection from said display device, and (y) disconnect said video connection via a first relay, and
  (ii) in a second connection mode, disconnect from said device emulator and connect to said DDC of said host computer, to enable said host computer to read said EDID setting data.

2. The KVM communication system of claim 1, wherein said video setting unit comprises a second relay configured to switch between said first and second connection modes.

3. The KVM communication system of claim 2, wherein said second relay is operated automatically.

4. The KVM communication system of claim 2, wherein said second relay is operated manually.

5. The KVM communication system of claim 1, comprising two or more device emulators, wherein each of said two or more device emulators is connected to a corresponding host computer.

6. The KVM communication system of claim 5, further comprising a switch module configured to selectively connect said host computer emulator to only one of said two or more device emulators.

7. A method for operating a Keyboard Video and Mouse (KVM) communication system, comprising:
 providing a KVM communication system, comprising:
  a host computer emulator configured to receive at least one peripheral device signal from at least one respective peripheral device, and to receive Extended Display Identification Data (EDID) information from a display device;
  a first unidirectional data connection adapted to transmit the peripheral device signals and the EDID information from the host computer emulator to a device emulator, wherein said device emulator is associated with a host computer and is adapted to transmit the peripheral device signals and the EDID information to the host computer;
  a video connection adapted to connect to a video interface of the host computer and to transmit a video stream from said host computer to said display device through a second unidirectional data connection; and
  a video setting unit configured to:
   (i) in a first connection mode, (x) disconnect from a Display Data Channel (DDC) of the host computer and connect to said device emulator, to receive and store said EDID information transmitted through said first unidirectional data connection from said display device, (y) disconnect said video connection via a first relay, and (ii) in a second connection mode, disconnect from said device emulator and connect to said DDC of said host computer, to enable said host computer to read said EDID setting data;

connecting at least one peripheral device and a display device to said host computer emulator;

connecting a host computer to said device emulator;

operating said video setting unit in said first connection mode, to receive and store said EDID information transmitted through said first unidirectional data connection from said display device; and operating said video setting unit in said second connection mode, to enable said host computer to read said EDID setting data.

8. The method of claim 7, wherein said video setting unit comprises a second relay configured to switch between said first and second connection modes.

9. The method of claim 8, further comprising operating said second relay automatically.

10. The method of claim 8, further comprising operating said second relay manually.

11. The method of claim 7, wherein said KVM communication system comprises two or more device emulators, wherein each of said two or more device emulators is connected to a corresponding host computer, the method further comprising connecting a corresponding host computer to each of said two or more device emulators.

12. The method of claim 11, further comprising a switch module configured to selectively connect said host computer emulator to only one of said two or more device emulators, the method further comprising operating said switch module to selectively connect said host computer emulator to only one of said two or more device emulators.

* * * * *